Dec. 11, 1962  F. J. CARSON ETAL  3,067,853
APPARATUS FOR HANDLING SHEET MATERIAL
Filed June 18, 1956  2 Sheets-Sheet 1
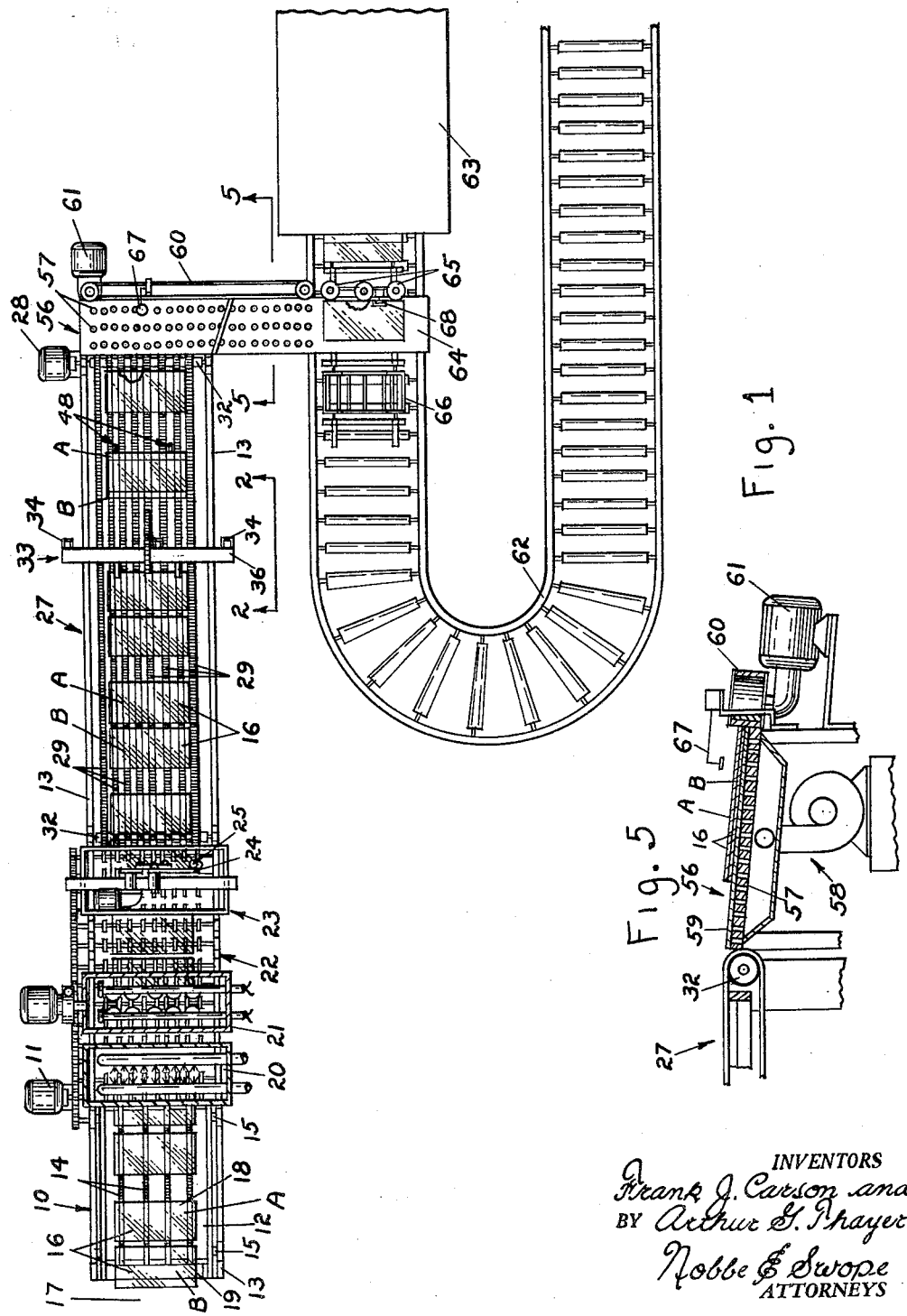
INVENTORS
Frank J. Carson and
BY Arthur G. Thayer
Nobbe & Swope
ATTORNEYS

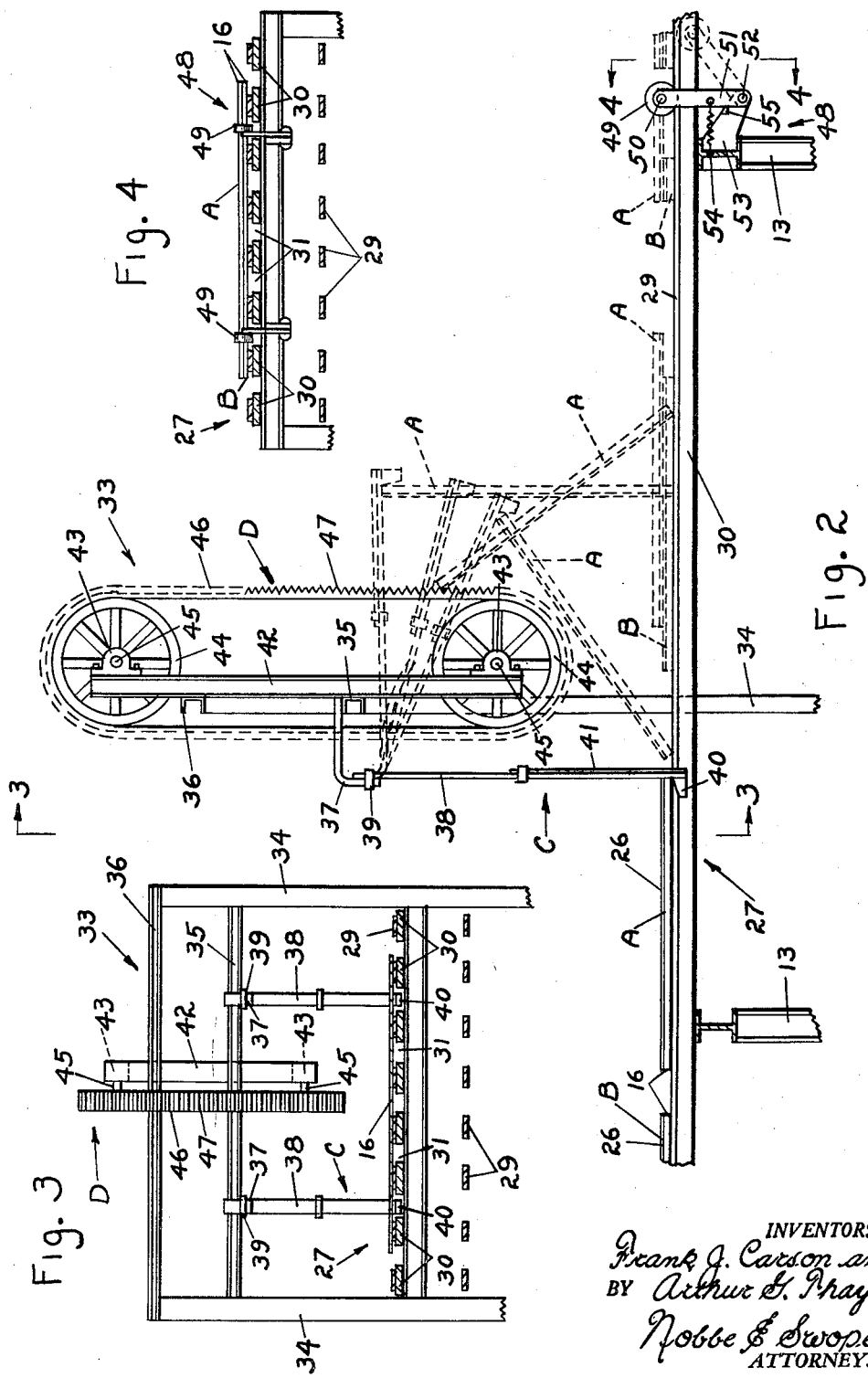

United States Patent Office
3,067,853
Patented Dec. 11, 1962

3,067,853
APPARATUS FOR HANDLING SHEET MATERIAL
Frank J. Carson, Toledo, and Arthur G. Thayer, Rossford, Ohio, assignors to Libbey-Owens-Ford Glass Company
Filed June 18, 1956, Ser. No. 592,210
14 Claims. (Cl. 198—35)

This invention relates broadly to an apparatus for handling sheet material. More specifically, it relates to an apparatus for turning sheet material.

In the production of laminated, bent sheet glass products such as windshields and backlights for automobiles, it is common practice to bend the sheets in pairs to the contour of a mold. Prior to the actual bending, the sheets are thoroughly cleaned and dried and a coating of water soluble parting material is spread over a surface of at least one of the sheets to keep the sheets from fusing to one another during the bending process. The sheets are then placed together and aligned with the parting material placed therebetween in preparation for bending.

According to past practice, pairs of sheets in close proximity to each other were carried vertically or edgewise by a conveyor through the various steps of the process, which involved complicated apparatus for fanning each pair of sheets during the washing, drying and coating operations and returning them to their original vertical position so they could readily be lifted off the conveyor in pairs and placed on a bending mold. However, with the increase in size and weight of the sheets this method no longer is practical or adequate.

It is therefore an object of this invention to provide an apparatus for handling large fragile sheets.

Another object of the invention is to provide an apparatus for turning or inverting sheet material.

A still further object of the invention is to provide an apparatus for coating one surface of each sheet and subsequently stacking the sheets in aligned pairs with the coated surfaces in contact with one another.

Other objects and advantages of the invention will become more apparent during the course of the following description when taken in connection with the accompanying drawings.

In the drawings wherein like numerals are employed to designate like parts throughout the same:

FIG. 1 is a plan view of glass bending equipment embodying the invention;

FIG. 2 is a side elevation of the sheet turnover and aligning devices taken on the line 2—2 of FIG. 1;

FIG. 3 is a cross section of the turn-over apparatus taken on the line 3—3 of FIG. 2;

FIG. 4 is a sectional view of the sheet aligning apparatus of the invention taken on the line 4—4 of FIG. 2; and FIG. 5 is a sectional view of a conveyor of the invention taken substantially along line 5—5 of FIG. 1.

Referring to FIG. 1 of the drawings, the numeral 10 generally indicates a conveyor driven by an electric motor 11. The conveyor is comprised of a horizontally disposed surface 12 supported on a frame 13 over which multiple endless belts 14 of rubber or other suitable material are moved by means of rolls 15 located at each end of the table. Identical sheets 16 are placed on the belts 14 at the loading station 17 by an operator and are spaced in pairs as at 18 substantially as shown in FIG. 1, with the lead sheet of a pair being designated by the letter A and the second sheet by the letter B. A guide 19 bears against one edge of each sheet 16 as it is loaded on the conveyor 10 to laterally align sheets A and B of each pair.

The sheets 16 are progressively moved through a washer 20 and a dryer 21 on a second conveyor 22, also driven by the motor 11, and thence to the coating apparatus for applying parting material to a surface of a sheet, generally indicated by the numeral 23. The coating apparatus is comprised of a motor driven arm 24 which moves an air pressure operated gun 25 in an arcuate path, transversely over the sheets 16 as they are advanced by the conveyor 22. The gun 25 distributes an air drying solution 26 of sodium sulphate and alcohol or equivalent material over the top surface of the sheets 16, which solution serves as a parting material to prevent the sheets from sticking together when subsequently stacked and heated during the bending operation.

Referring also to FIGS. 2, 3 and 4 of the drawings, the sheets 16 move off conveyor 22 onto another conveyor 27, driven by an electric motor 28. The conveyor 27 is supported on the frame 13 and is comprised of multiple, narrow, flat, rubber, longitudinally extending endless belts 29 supported on longitudinally extending slats 30, which are spaced apart as indicated at 31. The belts are supported at the ends of the conveyor 27 on rolls 32.

About midway of the horizontal run of the conveyor 27, there is provided a turn-over apparatus indicated generally at 33 to turn the coated lead sheet A of each pair of sheets over upon its paired sheet B so as to place the parting material 26 between the respective sheets as shown in dotted lines in FIG. 2.

The turn-over apparatus 33 is comprised of two basic portions; a lifting portion C which lifts and turns the lead sheet A, and a retarding portion D which retards its descent. Both portions are supported on a pair of uprights 34 which rise from the floor on either side of the conveyor 27 and connected together by cross members 35 and 36 above and parallel to the top surface of the conveyor 27.

The lifting portion C includes a pair of spaced brackets 37 (FIG. 3) fastened to the top side of the cross member 35. A strap 38 is attached by a clamp 39 to the end of each bracket 37 and extends downwardly into a space 31 between two of the conveyor belts 29 and companion slats 30. Secured to the ends of each of the straps is a rubber finger 40 which extends horizontally toward and below the level of the oncoming sheets (FIG. 2). The upper portion of the finger 40 is bevelled downwardly as it progresses away from the strap 38 to insure adequate grip on the edge of each sheet A. A piece of sheet metal 41 backs up the lower half of the strap, holding that portion rigid to prevent the finger 40 from striking the surface of the sheet A on its descent as will be described hereinbelow.

The descent retarding portion D of the turnover apparatus 33 is mounted on a vertical channel 42 fastened to the back side of the cross members 35 and 36 and extends below and above these members. A pair of bearings 43 are carried by the channel 42 at both ends thereof each mounting identical flat rimmed pulleys 44 on stub shafts 45. Trained over the pulleys 44 is an endless, flat-backed belt 46 of rubber or other suitable material having V-shaped indentations 47 extending transversely over the face thereof. The operation of this turn-over apparatus will be disclosed in detail hereinafter.

A sheet aligning mechanism 48 is secured to the frame 13 along the conveyor path beyond the turn-over apparatus and consists of a pair of rollers 49, each carried by pins 50 at one end of a lever 51. The lever 51 is pivoted at 52 on a bracket 53 which is welded or otherwise fastened to a cross member of the frame 13. A spring 54 fastened to the frame 13 and the lever 51 exerts a pull on the lever 51 to normally hold the lever 51 in a vertical position against a stop 55 formed on the bracket 53. As shown in FIG. 4 the rollers 49 extend into a space 31 between the slats 30 and above the lever of the belts 29 to intercept the stacked pairs of sheets 16 for a purpose to be described hereinafter.

Referring to FIGS. 1 and 5, a table 56 extends at right angles to the conveyor 27 and is provided with holes 57 in the surface thereof for the introduction of air under sufficient pressure to lift or float the paired sheets 16. The air or other medium is introduced to the table by suitable duct-work and blowers indicated generally at 58 in FIG. 5. The surface of this table may be covered with cloth 59 (FIG. 5) such as felt, knap mole skin or other material to further reduce friction (not shown in FIG. 1). In any event, it is desired that the cloth have some porosity so as to enable the air to pass therethrough and exert a lifting effect upon the glass. A belt conveyor 60, powered by an electric motor 61, extends across the back of the table 56 and engages the edge of the paired sheets 16 to move the sheets longitudinally with respect to the table 56 which is tilted toward the belt as may be seen in FIG. 5.

As shown in FIG. 1, the table 56 bridges over one side of a roller conveyor 62 which passes through a bending furnace 63. The table 56 and the cross belt conveyor 60 terminate in a land 64 at the juncture of the table with the furnace conveyor 62. At this point, rolls 65 extend inwardly above the top surface of the table 56 to relieve the driving engagement of the cross conveyor 60 from the pairs of sheets 16 as they are positioned on the land 64 over the conveyor 62.

As the pairs of sheets 16 are moved to the land 64, they are manually lifted therefrom and positioned on a bending mold 66 traveling in a repetitive circuit on the conveyor 62 through the furnace 63. To prevent he sheets from backing up on the respective conveyors, there is provided a normally closed air responsive switch 67 positioned over the table 56 above the level of the sheets, and a second normally closed switch 68, in parallel with switch 67, which extends above the surface of the table 56 in the area of the land 64. These switches are connected to the motors 11, 28 and 61 so as to interrupt movement of the conveyors when both switches are opened. The switch 67 is opened by movement of the sheets therepast which interrupts flow of air impinging upon an actuator not shown, while the switch 68 is actuated by contact of the sheets therewith.

Now in reviewing the operation of the apparatus, the blanks or sheets 16 are delivered to the loading station 17, arranged in pairs, and an operator loads one sheet of a matched pair designated by the letter A upon the conveyor 10 and in close proximity thereto he loads a second sheet B. In placing a second pair of sheets on the conveyor the lead sheet A is spaced a greater distance from the preceding sheet B of the previous pair as shown at 18 in FIG. 1 so as to keep the pairs of sheets separated from one another.

The sheets are carried by conveyor 10 to conveyor 22, through the washer 20, the dryer 21 and the coating apparatus 23 where the parting material 26 is evenly distributed over the top surface thereof. After being coated, the sheets, still spaced in pairs, are moved by conveyor 27 under the turn-over apparatus 33, where the lead sheet A is intercepted by the fingers 40, and as the conveyor 27 advances, the straps 38 pivot about the clamps 39 to raise the front edge of the sheet A off the conveyor as shown in FIG. 2.

The raising of the front edge of the sheet A by the fingers 40 continues till the sheet is raised to a little past the vertical position, whereupon the front edge of the sheet falls free of the fingers 40 until it is arrested by contact with the belt 46. As the conveyor 27 advances further, pulleys 44 are rotated clockwise by the weight of the sheet A upon the belt 46 until the sheet moves below the horizontal centerline of the lower pulley 44. The sheet A then falls freely over the sheet B with air providing a cushioning effect to prevent breakage.

As shown in FIG. 2, sheet A falls in slightly overhanging relation with respect to sheet B and they advance in that relation until the sheet A is engaged by the rollers 49 which are tensioned by the spring 54 to hold sheet A stationary until the lead edge of sheet B also engages the rollers 49. When both engage the rollers 49, the tension of spring 54 is overcome and the lever 51 is rotated to the right, as shown in dashed lines in FIG. 2, to permit the aligned sheets A and B to pass over the roller 49.

As the paired sheets 16 move onto the table 56 they interrupt the flow of air impinging upon the switch 67 and are moved sideways along the table 56 by the cross conveyor 60 to the land 64. The paired sheets 16 are then removed from the table 56 as they arrive on the land 64 and positioned on a bending mold 66 which is conveyed through the surface 63 where the sheets are bent in the usual manner.

It is of course to be understood that the form of the invention disclosed herein is to be taken as the preferred embodiment thereof, and that various changes in the shape, size and arrangement of parts may be resorted to without departing from the spirit of the invention or the scope of the following claims.

We claim:

1. In apparatus for handling sheets, means for moving sheets along a definite path, means disposed along the path of said sheets in position to engage the leading edge of a sheet and to lift said sheet upwardly while allowing another portion of said sheet to remain in substantially its original position, means for receiving the lifted edge of said sheet after it has been lifted upwardly by said sheet lifting means and after the support of said sheet lifting means has been removed therefrom, said sheet receiving means operating to support said sheet for movement during a portion of the travel of the sheet along said definite path and then being operable to disengage the sheet.

2. In apparatus for placing one sheet upon another sheet, means for supporting a plurality of sheets, means for lifting a portion of a first sheet and placing said sheet in contact with a second sheet, means for moving said sheet supporting means and said lifting means relative to one another, said sheet lifting means being positioned to engage the first sheet and move it into contact with said second sheet while allowing said second sheet to pass thereby without being moved to any substantial degree and then being movable into engagement with a third sheet to repeat the cycle of operation, said sheet lifting means further including means for cushioning the placement of the first sheet onto the second sheet to prevent breakage of said sheets.

3. In apparatus for placing one sheet upon another sheet as defined in claim 2, wherein said sheet supporting means includes, aligning means for aligning the sheets with respect to said supporting means.

4. In apparatus for handling sheets, means for moving said sheets along a definite path, means disposed along the path of said sheets in position to engage a first sheet and to turn said first sheet over upon a second sheet, means for cushioning the placement of said first sheet upon said second sheet to prevent breakage of said sheets, and means along said path for aligning the sheets which have been placed in contact with one another.

5. Apparatus for handling sheets, including means for supporting a sheet, means for lifting a portion of the sheet from said supporting means, means for moving said sheet supporting means and said lifting means relative to one another, said lifting means comprising movable means positioned to engage an edge of said sheet and to lift said edge upwardly as relative movement is effected between said lifting means and said sheet supporting means, said sheet lifting means further including a swingably mounted finger which engages an edge of the sheet and lifts the portion of the sheet engaged thereby upwardly and then swings back upon and engages the sheet when the sheet has been turned substantially 90 degrees.

6. Apparatus as claimed in claim 5, wherein said swingably mounted finger includes a projection which is adapted to slide under the sheet.

7. Apparatus for handling sheets, comprising means for supporting a sheet, means for lifting a portion of said sheet from said sheet supporting means, means for moving said sheet supporting means and said lifting means relative to one another, said sheet lifting means being positioned to engage a sheet along an edge portion thereof and to lift the edge portion of said sheet from said sheet supporting means as relative movement is effected between said sheet supporting means and said lifting means, and a movably mounted arresting means positioned to engage said sheet after it has been released by said lifting means and to lower said sheet toward said supporting means.

8. Apparatus as claimed in claim 7, wherein said arresting means includes a movable belt positioned adjacent said lifting means and is movable toward said supporting means.

9. In apparatus for handling sheets, means for supporting a sheet, means for lifting a portion of a sheet from said sheet supporting means, means for moving said sheet supporting means and said lifting means relative to one another, said lifting means comprising a movably mounted finger positioned to engage an edge of said sheet and to lift said sheet through an arc of substantially 90 degrees and to release lifting of said sheet, and movably mounted means positioned to engage said sheet after it has been released by said finger to lower said sheet toward said sheet supporting means.

10. In an apparatus for handling glass sheets, means for moving a plurality of glass sheets along a definite path, glass sheet inverting means disposed along the path of movement of said glass sheets in position to engage the first glass sheet and to turn said first glass sheet over and upon a second glass sheet forming a superimposed pair of glass sheets, means for cushioning the placement of said first sheet upon said second sheet to prevent breakage of said sheets, means disposed along said path for aligning the pair of glass sheets which have been placed in contact with one another by said glass sheet inverting means, a conveyor connected to said glass sheet inverting means to pick up a pair of aligned glass sheets and to carry them along a definite path as an aligned unit, and transfer means connected to said conveyor to individually pick-off each pair of aligned glass sheets and to move each said pair of glass sheets along a definite path independent of the path of said conveyor without disturbing the alignment of any pair of glass sheets.

11. In apparatus for handling glass sheets as defined in claim 10, wherein said transfer means includes a porous bed through which air under pressure is directed to exert a lifting effect on said pair of glass sheets.

12. In apparatus for handling glass sheets as defined in claim 11, wherein said porous bed is tilted with respect to the path of movement of said conveyor and positioned transverse thereto, and wherein said transfer means includes a belt conveyor extending longitudinally adjacent the lowermost portion of said tilted porous bed and engaging an edge of each successive pair of glass sheets to move said glass sheets along the path of said transfer means.

13. In apparatus for handling glass sheets as defined in claim 12, wherein said transfer means includes air responsive switch means positioned over said porous bed and connected to said conveyor and said transfer means, said switch means operative as a safety device to interrupt the movement of said glass sheets when any pair of glass sheets is moving out of its time cycle with respect to any other pair of glass sheets on said porous bed.

14. In an apparatus for handling glass sheets, means for moving a plurality of glass sheets along a definite path, glass sheet inverting means disposed along a path of movement of said glass sheets in position to engage the first glass sheet and to turn said first glass sheet over and upon a second glass sheet forming a superimposed pair of glass sheets, means disposed along said path for aligning the pair of glass sheets which have been placed in contact with one another by said glass sheet inverting means, a conveyor connected to said glass sheet inverting means to pick up a pair of aligned sheets and to carry them along a definite path as an aligned unit, and transfer means to individually pick off each pair of aligned glass sheets and to move each said pair of glass sheets along a definite path independent of the path of said conveyor without disturbing the alignment of any pair of glass sheets, said transfer means including a porous bed which is tilted with respect to the path of movement of said conveyor and positioned transverse thereto through which bed air under pressure is directed to exert a lifting effect on said pair of glass sheets, said transfer means additionally including a belt conveyor extending longitudinally adjacent the lowermost portion of said tilted porous bed and engaging an edge of each successive pair of glass sheets to move said glass sheets along the path of said transfer means.

References Cited in the file of this patent

UNITED STATES PATENTS

| | | |
|---|---|---|
| 1,386,659 | Small | Aug. 9, 1921 |
| 1,389,794 | Thiele | Sept. 6, 1921 |
| 2,128,316 | Paul | Aug. 30, 1938 |
| 2,176,307 | Lamb et al. | Oct. 17, 1939 |
| 2,261,972 | Matthews | Nov. 11, 1941 |
| 2,370,515 | Owen | Feb. 27, 1945 |
| 2,452,488 | Paddock et al. | Oct. 26, 1948 |
| 2,517,388 | Daves | Aug. 1, 1950 |
| 2,602,554 | Griffith | July 8, 1952 |
| 2,667,259 | Parker | Jan. 26, 1954 |
| 2,708,863 | Payne | May 24, 1955 |
| 2,710,103 | Castello et al. | June 7, 1955 |
| 2,711,776 | Woodburn | June 28, 1955 |
| 2,765,837 | Kenyon | Oct. 9, 1956 |
| 2,774,487 | Rounsefell et al. | Dec. 18, 1956 |
| 2,787,363 | Howdle | Apr. 2, 1957 |